April 8, 1941.                J. GOLDMAN                2,237,700
VISOR
Filed Nov. 13, 1939
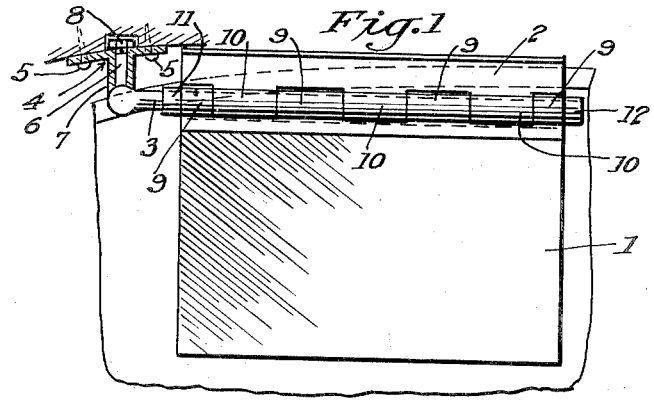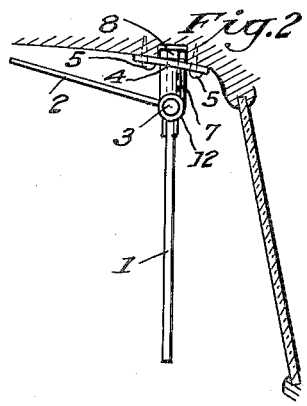
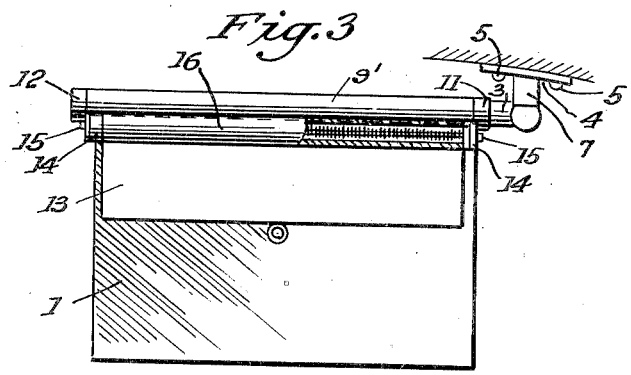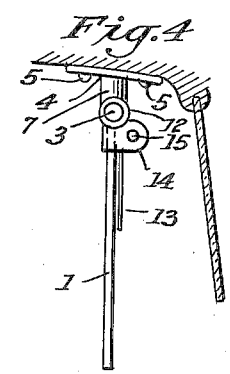
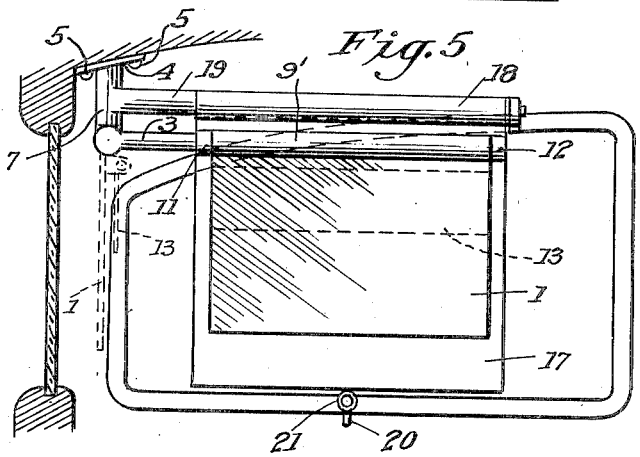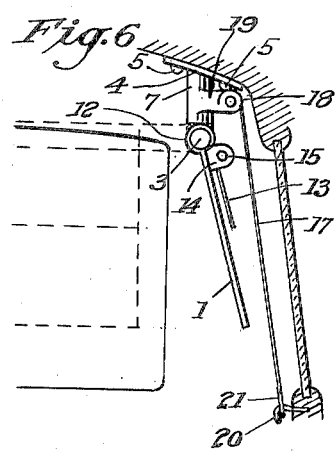
INVENTOR:
Julius Goldman,
BY Alan Franklin
ATTORNEYS.

Patented Apr. 8, 1941

2,237,700

UNITED STATES PATENT OFFICE 2,237,700

VISOR

Julius Goldman, Los Angeles, Calif.

Application November 13, 1939, Serial No. 303,983

2 Claims. (Cl. 296—97)

This invention relates to visors for automobiles.

One of the objects of the invention is to provide a visor with a translucent shade and an opaque shade, constructed and arranged so that either the translucent shade or the opaque shade may be brought into position for shielding the eyes of an occupant of an automobile from the glare of the sun or the glare of the headlights of approaching automobiles or other lights.

Another object is to provide a visor of the character stated which may be adjusted to shield the eyes of an occupant of an automobile, either from the front or the sides of the automobile, without obstructing the vision of the occupant.

Another object is to provide a translucent shade which may be brought into position to cover a large portion of the windshield of an automobile, and particularly the lower part of the windshield below my visor, to more completely shield the eyes of an occupant of an automobile from the glare of the strongest light.

A further object is to provide a translucent shade, which may be drawn adjacent the windshield of an automobile, and a visor mounted to be brought adjacent said translucent shade or adjacent a side window of the automobile, which visor includes a visor translucent shade and an opaque shade, either of which may be brought into shading position in either of said positions of the visor.

In the drawing—

Fig. 1 is a rear view of my visor shown mounted in the front part of an automobile with its translucent shade swung down in position inside of the windshield for shielding the eyes of an occupant of the automobile from the glare of light from the front of the automobile, and with its opaque shade shown swung into its uppermost position out of use.

Fig. 2 is an end view of my visor as shown in Fig. 1.

Fig. 3 is a front view of a modification of my visor with its translucent shade swung down into position for use and with its opaque shade drawn down partly over the front of said translucent shade.

Fig. 4 is an end view of the modification of my visor shown in Fig. 3.

Fig. 5 is a rear view of another modification of my invention showing, in conjunction with my visor, a translucent shade which may be lowered inside of the windshield and below my visor.

Fig. 6 is an end view of the modification of my invention as shown in Fig. 5.

Referring more particularly to the drawing, in which corresponding parts are designated by the same reference characters in all of the figures, my visor includes a translucent shade 1, an opaque shade 2, a supporting rod 3 on which said shades are hinged, and a bracket 4 secured by screws 5 to the wall of the body of an automobile in the upper left front corner of the body, on which bracket one end of said supporting rod is pivotally supported by means of a stud pivot 6, extending upwardly from said end of said rod through a bearing 7 depending from said bracket 4, and a nut 8 threaded on the upper end of said pivot engaging the upper side of said bracket. The shade 1 is hinged on the rod 3 by means of spaced knuckles 9 formed on the hinged edge of said shade, through which knuckles said rod extends, and the shade 2 is likewise hinged on said rod 3, rearwardly of the shade 1, by means of spaced knuckles 10 formed on the hinged edge of said shade through which knuckles said rod extends, said knuckles 10 being positioned on said rod between the knuckles 9 on the shade 1. A collar 11 is secured on the rod 3 near its inner pivoted end and a collar 12 is secured on the outer end of said rod, between which collars are positioned the shades 1 and 2, with said collars engaging the knuckles 9 at the inner and outer ends respectively of the shade 1 to hold the shades 1 and 2 in position on the rod 3 against longitudinal displacement thereon.

The operation of my visor, as above described is as follows:

When my visor is not in use both shades 1 and 2 are swung into their uppermost positions adjacent the roof of the automobile out of the vision of the driver of the automobile. When the light of the sun in the daytime or the light of approaching motor vehicles at night or other light glares from the front through the windshield of the automobile, the driver of the automobile swings down the translucent shade 1 into position to shade his eyes from the glare of the light, while allowing him to see sufficiently through said shade to drive the automobile. If the light is so strong as to glare through said translucent shade 1, the opaque shade 2 is swung down behind the shade 1, which opaque shade shuts out the glare of the light completely from the vision of the driver, so that the driver may look ahead under the visor in the same manner as he may look ahead under a conventional visor.

My visor may be swung rearwardly adjacent the left side window of the automobile on the pivot 6 for shading the eyes of the driver from the glare of light at the left side of the automobile.

In the modification of my visor as shown in Figs. 3 and 4, the hinged opaque shade 2 is eliminated, while an opaque roller shade 13 is mounted in front of the shade 1 by means of bearings 14 outstanding rearwardly from said shade 1 adjacent the hinged edge thereof, in which bearings are journaled the trunnions 15 extending from the ends of the roller 16 of said roller shade 13.

In the operation of the modification of my invention as shown in Figs. 3 and 4, the translucent shade 1, together with the opaque roller shade 13 wound up on its roller 16, are swung on the rod 3 into their uppermost position above the windshield of the automobile, when my visor is not in use. When the light glares through the windshield of the automobile the translucent shade 1 with the opaque roller shade 13 wound up are swung down between the windshield and an occupant of the automobile as shown in Fig. 4. If the glare of the light is too strong to be shut out sufficiently by the translucent shade 1 the opaque roller shade 13 may be drawn down in front of said translucent shade a suitable distance to shut out the glare of the light completely. When the glare of the light is through the left side window of the automobile my visor may be swung to the left, on its pivot 6, until it is adjacent said window, and if the light is too strong to be shut out sufficiently by the translucent shade 1, the opaque roller shade 13 may be drawn down behind said translucent shade to shut out said light. The roller shade 13, being behind the translucent shade 1, when my visor is swung adjacent said side window, will not be blown about by the wind coming through said side window while open.

In the modification of my invention shown in Figs. 5 and 6 a translucent roller shade 17 is employed in conjunction with my visor, as shown in Figs. 3 and 4, the roller 18 of which shade is mounted above the windshield of the automobile forwardly of the rod 3, on a rod 19 formed on and extending from the bearing 7 of the supporting bracket 4.

The translucent roller shade 17 may be drawn down over the inner side of the windshield to shade the eyes of an occupant of the automobile from the glare of light from the front of the automobile, without the use of the shades 1 and 13 of my visor, which shades at such time are swung into their uppermost position above the windshield. The shade 17 may be secured, when drawn down into shading position, by a hook 20, on the lower frame member of the windshield of the automobile, and an eye 21 on the lower edge of said shade, which eye is adapted to engage said hook. If the glare of the light is too strong to be shut out sufficiently by the translucent shade 17, the shade 1 and the wound roller shade 13 may be swung down on rod 3 behind the shade 17 so that both said translucent shades 17 and 1 will shield the eyes of the occupant of the automobile from the glare of the light from the front of the automobile. If the two translucent shades 1 and 17 are not sufficient to shut out the glare of said light, the opaque roller shade 13 may be drawn down in front of the translucent shade 1 to shut out the glare of said light. The shades 1 and 13 of my visor may be swung adjacent the left side window to shut off the glare of the light through said window, as above described while the translucent roller shade 17 is either wound up on its roller above the windshield out of use, or drawn down inside of the windshield into position for use.

The translucent roller shade 17 may be made of any suitable material, such as flexible glass, "elastic glass," Lucite, Celluloid, Cellophane or any flexible plastic. The translucent shade 1 may be made of unbreakable smoked glass. Said translucent shades may be made in any desired color to shade the eyes of an occupant of an automobile or other vehicle, so that it will not be necessary for such occupant to wear sun glasses or goggles.

While I have described my invention as particularly applicable to automobiles it is obvious that it may be applied to other vehicles including airplanes.

I claim:

1. A visor for automobiles comprising a bracket secured in the upper part of an automobile, a translucent roller shade mounted on said bracket to be drawn down adjacent the windshield of the automobile, a second translucent shade mounted on said bracket to be brought behind said first translucent shade or adjacent a side window of the automobile, and an opaque roller shade mounted on said second translucent shade to be brought adjacent said second translucent shade, when said second translucent shade is drawn down behind said windshield, and adjacent the inner side of said second translucent shade when said second translucent shade is brought adjacent a side window of the automobile.

2. A visor as disclosed comprising a bracket secured to the upper part of a vehicle, a translucent roller shade mounted on said bracket to be drawn down adjacent the windshield of the vehicle, a rod turnably mounted at one end in said bracket to be swung into position adjacent the upper edge of the windshield or into position adjacent the upper edge of a side window of the vehicle, a second translucent shade hinged on said rod to be swung down into shading position in either of said positions of said rod or upwardly out of shading position into the upper part of the vehicle, and an opaque roller shade mounted on said second translucent shade to be drawn down over said second translucent shade into shading position in either position of said rod.

JULIUS GOLDMAN.